United States Patent
Acar et al.

(10) Patent No.: US 7,689,942 B2
(45) Date of Patent: Mar. 30, 2010

(54) SIMULTANEOUS POWER AND TIMING OPTIMIZATION IN INTEGRATED CIRCUITS BY PERFORMING DISCRETE ACTIONS ON CIRCUIT COMPONENTS

(75) Inventors: Emrah Acar, Montvale, NJ (US); Qian Haifeng, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 11/845,056

(22) Filed: Aug. 25, 2007

(65) Prior Publication Data

US 2009/0055780 A1 Feb. 26, 2009

(51) Int. Cl.
G06F 17/50 (2006.01)
(52) U.S. Cl. .................. 716/2; 716/1; 716/4; 716/6
(58) Field of Classification Search .............. 716/2, 716/4, 6
See application file for complete search history.

(56) References Cited

U.S. PATENT DOCUMENTS

| | | | | |
|---|---|---|---|---|
| 5,305,229 | A * | 4/1994 | Dhar | 703/14 |
| 5,640,328 | A * | 6/1997 | Lam | 716/8 |
| 5,883,811 | A * | 3/1999 | Lam | 716/6 |
| 6,363,520 | B1 * | 3/2002 | Boubezari et al. | 716/18 |
| 6,795,954 | B2 * | 9/2004 | Andreev et al. | 716/6 |
| 7,117,461 | B1 * | 10/2006 | Srinivasan et al. | 716/4 |
| 7,337,416 | B1 * | 2/2008 | Srinivasan et al. | 716/4 |
| 7,340,698 | B1 * | 3/2008 | Srinivasan et al. | 716/4 |
| 2001/0010090 | A1 * | 7/2001 | Boyle et al. | 716/2 |
| 2005/0278702 | A1 * | 12/2005 | Koyfman et al. | 717/124 |

* cited by examiner

Primary Examiner—Vuthe Siek
Assistant Examiner—Patrick Sandoval
(74) Attorney, Agent, or Firm—George Willinghan; August Law, LLC

(57) ABSTRACT

A graph-based iterative method is provided for selecting component modifications in an integrated circuit design that reduce the power consumption to a minimum while still meeting timing constraints. Channel-connected components are represented as nodes in a timing graph and edges in the timing graph represent directed paths. From the timing graph, a move graph is constructed containing a plurality of move nodes. Each move node represents a change to one of the components in one of the timing graph nodes. A given timing graph node can result in a plurality of move nodes. Move nodes can be merged into group nodes, and both the move nodes and group nodes are assigned a weight based on the change in power and timing effects of the associated components changes. These weights are used to select move nodes or group nodes. In general, a set of move or group nodes is selected representing the maximum cumulative weight and the components changes associated with the nodes in the set are performed on the integrated circuit design. Moves that cause timing violations are reversed. The node weights are updated following components changes and the selection of node sets is repeated iteratively until the power consumption converges to a minimum.

19 Claims, 5 Drawing Sheets

Converson from a Timing Graph to a Move Graph

CCC Timing Graph

FIG. 1

Converson from a Timing Graph to a Move Graph

FIG. 2

The Transitive Closure of the Timing Graph of Fig. 1

FIG. 3

Merging Two Independent Nodes

FIG. 4

Merging Two Dependent Nodes

FIG. 5

SIMULTANEOUS POWER AND TIMING OPTIMIZATION IN INTEGRATED CIRCUITS BY PERFORMING DISCRETE ACTIONS ON CIRCUIT COMPONENTS

FIELD OF THE INVENTION

The present invention relates to the field of integrated circuit design.

BACKGROUND OF THE INVENTION

Circuit optimization is essential to perform power-performance trade-off. Most of the time, circuits are over-powered to meet timing (speed) constraints. This can be a big problem for high-performance chips for which there is increasingly important power limitations. Hence, most of the high-performance circuits are now becoming limited by power constraints. Although timing performance is still the primary target for integrated circuit (IC) manufacturers, power is recognized as the real performance limiter with current integration technologies. As devices shrink, they run faster at the expense of excessive leakage current. This poses itself as a tax on the performance, as the leakage power is becoming the dominant portion of the total power of a circuit, International Technology Roadmap for Semiconductors, Semiconductor Industry Association, 2004. Available at http://public.itrs.net. Hence power optimization must be performed at various stages of the design flow.

Circuit optimization research used to be concerned with automatically tuning the circuit solely for timing performance, and the transistor width used to be the primary variable to be continuously tuned. Established transistor sizing methodologies can be roughly divided into two categories. The first is sensitivity-based discrete heuristics represented by TILOS, which is described in J. P. Fishburn and A. E. Dunlop, *TILOS: A Posynomial Programming Approach to Transistor Sizing*, International Conference on Computer-Aided Design Digest of Technical Papers, pp. 326-328 (1985) and J. M. Shyu, A. Sangiovanni-Vincentelli, J. P. Fishburn and A. E. Dunlop, *Optimization-Based Transistor Sizing*, IEEE Journal of Solid Slate Circuits, vol. 23, no. 2, pp. 400-409 (1988). The transistor sizing operation is discretized, for example, a downsizing or upsizing operation can be defined as scaling the width of a transistor by a constant factor. The solution is optimal under certain simplistic delay f model, but suboptimal in general. The second is continuous nonlinear optimization, followed by snapping transistor sizes to the technology-imposed values as described in A. R. Conn, I. M. Elfadel, W. W. Molzen, P. R. O'Brien, P. N. Strenski, C. Visweswariah and C. B. Whan, *Gradient-Based Optimization of Custom Circuits Using a Static-Timing Formulation*, Proceedings of Design Automation Conference, pp. 452-459 (1999). Because its solution in the continuous domain is optimal and transistor widths are near-continuous variables, the quality is typically superior to discrete heuristics, at the cost of high runtime.

With the advent of multiple-$V_t$ devices, voltage islands and multiple oxide thickness, the list of candidate variables is now expanded by a number of discrete operations, e.g., as described in K. Fujii, T. Douseki and M. Harada, A *Sub-IV Triple-Threshold CMOS/SIMOX Circuit for Active Power Reduction*, International Solid-State Circuits Conference Digest of Technical Papers, pp. 190-191 (1998), which often offer better power-delay tradeoffs than transistor sizing. Most prominently, because sub-threshold leakage current is an exponential function of $V_t$, see L. Wei, K. Roy and C. Koh, *Power Minimization by Simultaneous Dual-Vth Assignment and Gate-Sizing*, Proceedings of IEEE Custom Integrated Circuits Conference, pp. 413-416 (2000), changing certain gates to higher $V_t$ has the potential to achieve more power savings than gate sizing alone with the same timing budget. Recently gate-length is also suggested as a new design parameter, where it can be selected from a variety of alternatives as opposed to a single design length, P. Gupta, A. B. Kahng, P. Sharma, and D. Sylvester, *Gate-Length Biasing for Runtime Leakage Control*, IEEE Transactions on Computer-Aided Design, pp. 1475-1485, August 2006.

Since the optimal solution is most likely achieved by the simultaneous consideration of all design options, various methods have been proposed to incorporate multiple operations. However, it is not trivial to incorporate discrete variables into a continuous sizing methodology, and the cost is often sub-optimality and significant runtime increase. Therefore, most of these multi-variable methods are heuristics and are often based on sensitivities defined similar to TILOS.

SUMMARY OF THE INVENTION

Systems and methods in accordance with the present invention, perform concurrent optimization of an integrated circuit using multiple candidate optimization operations. Suitable methods are implemented in a software procedure that reduces power while preserving user-specified speed constraints. Discrete operations are performed on circuit components, e.g., transistors, gates, a group of transistors or a group of gates, that can reduce power consumption while still meeting the required speed requirements. Suitable operations include, but are not limited to, threshold voltage assignment, device length assignment, power supply assignment and discrete sizing, e.g., shrinking by a scalar figure.

The timing graph is extended into a move-graph where the discrete actions that can be taken on the circuit are placed. The graph allows us to specify weights, i.e., power-savings, to build topological and structural relationships and to monitor the impact on the timing or speed of the chip while doing power optimization. Methods in accordance with the present invention do not formulate a linear program that can be solved with relaxed integer or binary variables. A graph-based engine is used that performs discrete optimization without any relaxation of the design variables. All of the changes are performed and evaluated concurrently by constraints given by the speed of the chip and the structural or layout relationships, returning a more optimal result faster in less computational time.

In one exemplary embodiment, the present invention is directed to a method for optimizing an integrated circuit design by establishing an acyclic timing graph comprising a plurality of nodes where each node corresponding to a set of channel-connected components in an integrated circuit design. The timing graph is converted to a move graph comprising a plurality of move nodes, each move node corresponding to a change in at least a portion of one of the channel-connected components corresponding to one of the timing graph nodes, and the move graph is used to identify modifications to components in the integrated circuit design that reduce power consumption in the integrated circuit design without creating a timing violation. In one embodiment, each timing graph node is converted into two or more move nodes. The timing graph includes directed paths between nodes and the step of converting the timing graph to a move graph further comprises maintaining directed paths from the timing graph in the move graph.

In order to determine which nodes in the move graph to select, a timing impact and a power impact are identified for each move node resulting from the change in the channel-connected components associated with each move node. The timing impact and power impact are used to assign a node weight to each move node, and this weight is used to identify the move nodes to select for application of the moves or changes associated with these nodes to the integrated circuit design. In addition to single nodes within the move graph representing a single change in components, move nodes are merged into group nodes. Each group node results from the merger of at least two move nodes. Since the creation of group nodes removes single nodes from the move graph, edges and blank nodes are added to the move graph as needed to maintain connectivity among the move nodes and the group nodes. In addition to merging single nodes, group nodes can also be merged. As with the selection of single nodes for application to the circuit design, a timing impact and a power impact are identified for each group node resulting from all changes in the channel-connected components associated with each move node in each group node. This represents a combined impact from all of the impacts associated with the member nodes of the group node. This combined timing impact and power impact is used to assign a node weight to each group node.

In one embodiment, components within the integrated circuit design that are not to be modified are identified, and the identification of these components is propagated through the timing graph and the move graph, including through all nodes in a group node. In one embodiment, a weight is assigned to each move node based on a timing impact and a power impact resulting from the change in the channel-connected components associated with each move node, and a set of move nodes from the move graph are selected such that the cumulative weight associated with the move nodes in the set of move nodes is a maximum and a directed path does not exist between any two move nodes in the set of move nodes. Selection of the set of move nodes includes identifying a transitive closure graph for the move graph and identifying the weighted maximum independent set for the transitive closure graph. Having selected a set of move nodes, changes in the channel-connected components corresponding to move nodes in the selected set of move nodes are applied to the circuit design. Following applied changes in the circuit design, node weights are updated in accordance with the applied changes in the channel-connected components. If timing violations in the overall integrated circuit design are caused by the applied changes, the applied changes associated with these timing violations are reversed or removed.

DETAILED DESCRIPTION

Exemplary embodiments of systems and methods in accordance with the present invention utilize a circuit-level optimization procedure that manipulates threshold voltage assignments, transistor widths, gate channel lengths and other parameters that allow a given integrated circuit (IC) arrangement to meet power and timing requirements. This is different than continuous optimization, where some design parameters can be chosen freely on an analog scale. Methods in accordance with the present invention are sensitivity-based and perform discrete optimization. In one embodiment the operation of the methods is made discrete as is described in J. P. Fishburn and A. E. Dunlop, *TILOS: A Posynomial Programming Approach to Transistor Sizing*, International Conference on Computer-Aided Design Digest of Technical Papers, pp. 326-328 (1985). However, the sensitivity is defined in an inverse way. Starting with an arrangement that meets the desired timing requirement, the power is minimized without creating a timing violation.

To reduce the greediness and avoid the lack of global view in J. P. Fishburn and A. E. Dunlop, *TILOS: A Posynomial Programming Approach to Transistor Sizing*, International Conference on Computer-Aided Design Digest of Technical Papers, pp. 326-328 (1985) and L. Wei, K. Roy and C. Koh, *Power Minimization by Simultaneous Dual-Vth Assignment and Gate-Sizing*, Proceedings of IEEE Custom Integrated Circuits Conference, pp. 413-416 (2000), methods in accordance with the present invention employ a graph-based iterative approach to look for an optimal set of transistors to modify in each iteration. Although this approach may appear similar in principle to C. Chen, A. Srivastava and M. Sarrafzadeh, *On Gate Level Power Optimization Using Dual-Supply Voltages*, IEEE Transactions on Very Large Scale Integration (VLSI) Systems, vol. 9, no. 5, pp. 616-629 (2001) and Q. Wang and S. B. K. Vrudhula, *Static Power Optimization of Deep Submicron CMOS Circuits for Dual $V\_t$ Technology*, International Conference on Computer-Aided Design Digest of Technical Papers, pp. 490-496 (1998), for $V_t$ assignment only, methods in accordance with the present invention contain differences that make the method more likely to find a near-optimal solution and with less computational complexity. Exemplary embodiments of methods in accordance with the present invention utilize a general framework of truly simultaneously considering multiple discrete design choices. The set of changes chosen during an iteration is a mix of, for example, sizing operations and $V_t$ assignments.

Systems and methods in accordance with the present invention support design options including, but not limited to, oxide thickness assignment and $V_{dd}$ selection. In addition, emphasis is placed on handling constraints in industrial designs, which may originate from high-level issues, structural integrity of the design data, or layout related issues.

Figure 1:
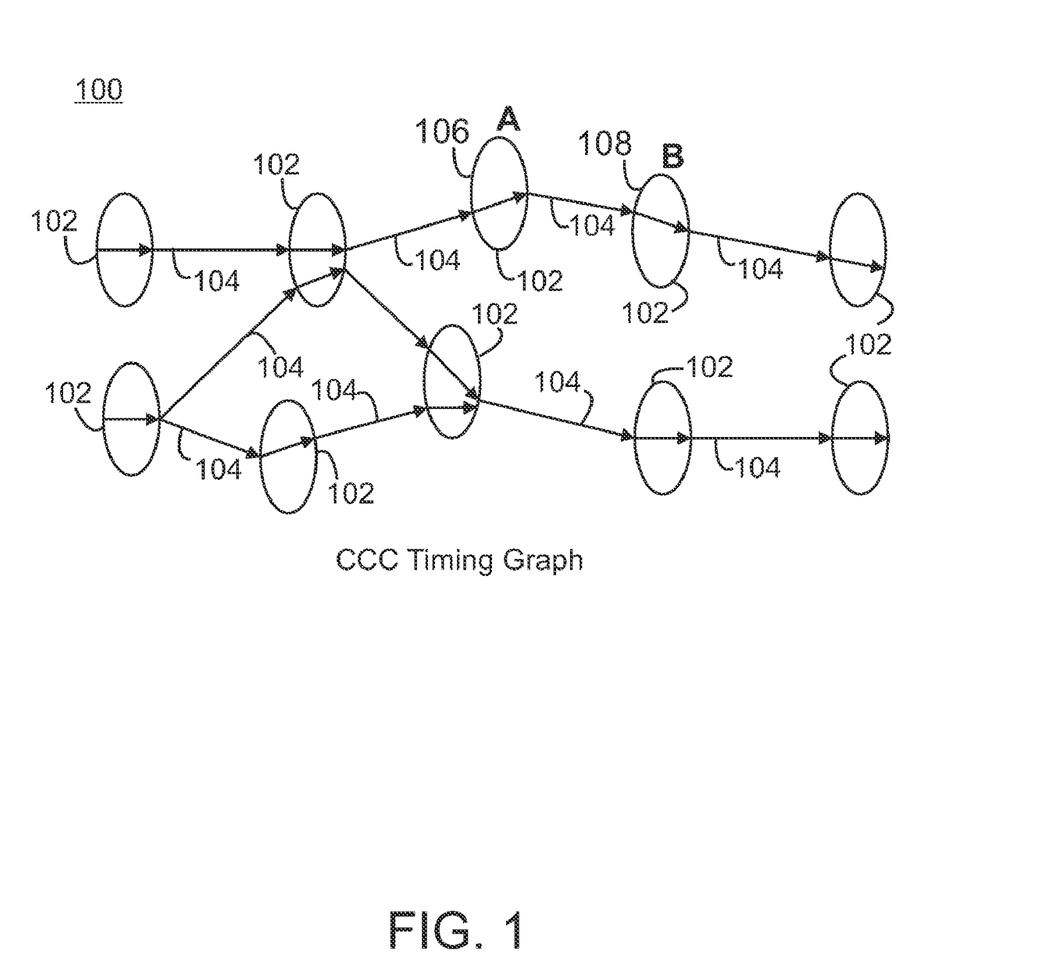
FIG. 1 is a schematic representation of an embodiment of a timing graph for use in accordance with the present invention.

Referring initially to FIG. 1, an exemplary embodiment of a timing graph 100 as used in a timing engine is illustrated. The timing graph includes a plurality of nodes 102 that correspond to channel-connected components (CCC). These CCC's represent sets of transistors that are source-drain connected and that roughly correspond to gates. The timing graph also includes a plurality of directed edges 104 connecting the nodes. These directed edges correspond to timing propagation segments. Each one of the plurality of directed edges represents the delay of a CCC or the interconnect delay of a net. In one embodiment, in order to use this timing graph, the assumption is made that a static timing analysis is available that supports transistor-level netlists by characterizing individual devices in clusters with proper logic functions.

In one embodiment, the delay and slew values are obtained empirically using simulation in an implementation environment. Alternatively, the delay and slew values are obtained computationally using analytical equations or from stored delay and slew values in a look-up table. The directed paths in the timing graph represent data paths within one clock cycle. Therefore, the start and end nodes associated with a given directed path are primary inputs or outputs and latches. For IC designs that use transparent latches, the start and end nodes are those with the same clock phase. Timing analysis provides the arrival time (AT) at each node in the graph and, given a timing target, the required arrival time (RAT) at each node. The slack at a node is defined as RAT-AT, and the slack at the output pin of a CCC is referred to as the timing slack of this CCC.

In one embodiment, the optimization variables are represented by the vector $x=[w_1, v_1, w_2, v_2 \ldots w_N, v_N]^T$ where each w is the continuous transistor width variable, and each v is a discrete variable representing a choice of design parameters in a countable feasible set. For simplicity, each v can be thought of as $V_t$ levels for devices. The operation can be performed in three granularity levels. The first granularity level is the CCC level. In this level, all transistors in a CCC must be scaled together, and must share the same discrete parameter, e.g., V. Then N is the number of CCC's in the circuit. The second granularity level is the Ptree/Ntree level. In this level, PMOS transistors in a CCC must be scaled together and must have the same discrete parameter, while NMOS transistors in a CCC must be scaled together and must share the same discrete parameter. For each CCC, there is a (w,v) pair for the PMOS transistors and another pair for the NMOS transistors. Therefore, N is twice the number of CCC's in the circuit. The third granularity level is the transistor level. In this level, every single transistor can be modified independently and needs a (w,v) pair. Therefore, N is the total number of transistors in the circuit.

In one embodiment, the application of power-saving techniques are considered in which transistor width downsizing and high-$V_t$ insertion are selected. A given move is a single change in an entry of the vector x. Therefore, a move affecting a single design object is a single move. A group move is a set containing a plurality of single moves that are constrained to be executed together due to either a design or netlist constraint. In one embodiment, 65 nm silicon on insulator (SOI) technology is used with such opportunities to mitigate leakage power.

A delay engine is used to compute $\Delta D$, which is the delay impact of any single move. In its most general form, $\Delta D$ represents the sum of the change in the internal delay of this CCC, the change in the wire delay at its input and change in the wire delay at its output. The change in the wire delay at its input is typically small and can often be ignored. $\Delta D$ can be obtained by simulation, analytical equations or table lookup, and methods in accordance with the present invention are independent of this choice of technique. The value of $\Delta D$ is nonnegative for any move. $\Delta D$ is computed with the assumption that only one entry of x is modified and that $\Delta D$ is a function of both the move and the current status x. Therefore, $\Delta D$ is recomputed for each different value of x. Alternatively, $\Delta D$ is computed incrementally when the specific CCC is modified and is tagged along with the delay calculation in an incremental static timing analysis engine.

An analysis engine is used to compute P(x), which is the power consumption of the design specified by x. Depending on the application, P(x) can represent the power consumption due solely to leakage, to the sum of leakage, dynamic, and short-circuit power, or more generally, to a weighted sum of all three power components. Exemplary methods in accordance with the present invention are independent of this choice of object function. The power impact of a single move can be defined as $\Delta P=P(x)-P(x')$ where x' differs from x by only one entry.

Like delay, power consumption can be computed by various methods, and methods in accordance with the present invention for computing power consumption are independent of the choice of technique. Like $\Delta D$, the power impact, $\Delta P$ can be calculated incrementally.

The function S(x) is the minimum of all CCC timing slacks in the design solution specified by x. $S_{target}$ is defined as a given constant that represents the desired timing target. Therefore, the power optimization problem can be stated as follows. Given an initial solution $x_1$ such that $S(x_1)>S_{target}$, given the timing analysis and power estimation engines that can compute $\Delta D$ and $\Delta P$ of any single move for any solution vector, find $x_2$ such that $P(x_2)$ is minimized, the w entries of $x_2$ are equal or less than the corresponding entries of $x_1$, the v entries of $x_2$ are equal or greater than the corresponding entries of $x_1$ and $S(x_1)>S_{target}$. This problem statement only assumes the availability of $\Delta D$ and $\Delta P$ of single moves and does not make any assumption about the joint effect of multiple moves. For example, if a move is applied to CCC-A 106 and another move is applied to CCC-B 108 (FIG. 1), the resulting slacks of both CCCs may or may not be the original slacks deducted by $\Delta D_A+\Delta D_B$ depending on the accuracy of the timer engine.

A typical macro design for a high-performance integrated circuit includes logic synthesis, layout design and electrical and physical verification on multiple databases with parallel representations of the design. Modification of the netlist locally without propagating the changes to other representations is not easy, and if the original design is in a hierarchical data model, the modified design often needs to maintain a similar hierarchy, which maps any local change to multiple changes throughout the design. Therefore, there are limitations from the design methodology, which require multiple objects to be considered together. As used herein, this requirement is referred to as grouping. For example, if the hierarchy of the original design is desired to be kept the same, all instances of a particular cell in the design need to be grouped together. If any instance of a particular cell is to be modified, other instances of that cell should follow the same modification. Hence, in evaluating the impact of modifying an instance, the joint effects of changing all the instances of the same type used in the netlist are analyzed. Similar limitations can be layout-based. For example, two cells need to be in the same $V_t$ class if they are spatially close, and their $V_t$ moves are grouped together. The concept of grouping may also be used to represent other classes of constraints.

Another constraint is that certain circuit elements are not intended for any modifications. Examples of these circuit elements include, but are not limited to, clock circuitry, clock gating and power gating modules. A no-touch designation is associated with these elements. If a no-touch-designated object is also inside a group, the no-touch designation is propagated to all other items in the group. Design changes are prohibited for certain CCCs containing no-touch objects.

Figure 2:
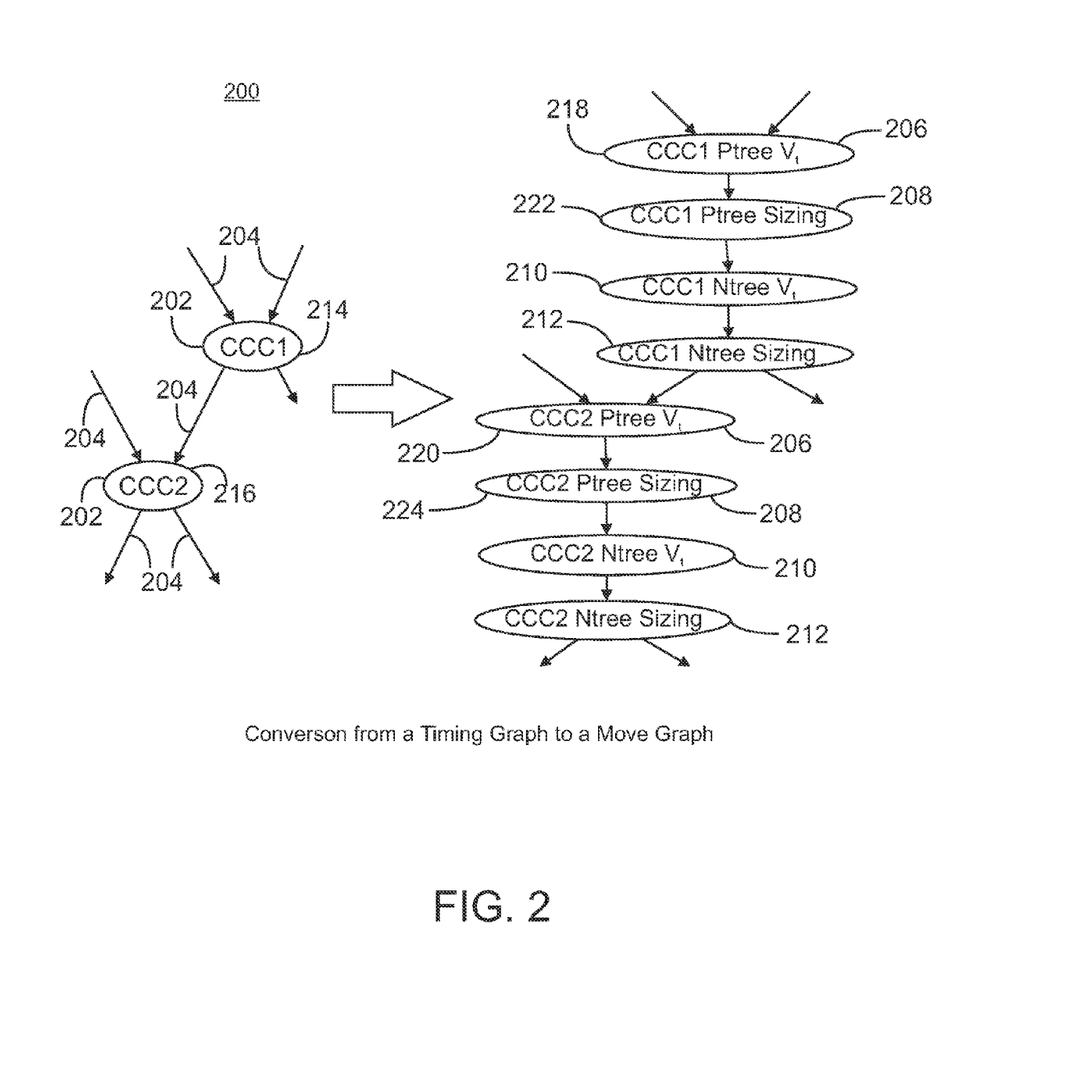
FIG. 2 is a schematic representation of an embodiment of a conversion of a timing graph to a move graph in accordance with the present invention.

Exemplary methods in accordance with the present invention utilize an iterative procedure. During each iteration, a set of moves are chosen and applied to a given IC design, such that the power saving is maximized in accordance with prescribed parameters and that no two modified objects share a data path in a given iteration. In one embodiment, a timing graph is converted into a move graph. The directed graph is constructed such that each node in the graph corresponds to a single move based on the original CCC timing graph and available design operations. Referring to FIG. 2, an embodiment of the conversion of a timing graph into a move graph 200 in accordance with the present invention is illustrated. Two CCCs 202, i.e., nodes, from a timing graph are illustrated. One CCC is driving the other CCC. As illustrated, timing propagation edges inside CCCs are not illustrated. The illustrated edges 204 carry connectivity information. If there exists a directed path between two CCCs, then these CCCs share a data path in the design, and the $\Delta D$ of a move on one of the two CCCs can affect the timing slack of the other CCC.

Conversion of the timing graph into a move graph for the two CCCs illustrated utilizes an algorithm in the Ptree/Ntree mode. Four possible operations can be used on a CCC. All PMOS transistors can be changed to higher $V_t$ 206. All NMOS transistors can be changed to higher $V_t$ 210. All PMOS transistors can be downsized with a constant factor 208, and all NMOS transistors can be downsized with a constant factor 212. Each operation produces a distinct node in the move graph. Therefore, each node in the timing graph is converted to a plurality or string of nodes in the move graph, where each move node represents a single change on the associated CCC. Therefore, each node in the move graph has its own $\Delta D$ and $\Delta P$ pair.

The arrangement of nodes in the move graph depends on the mode in which the algorithm operates. If the algorithm operates in the CCC mode, each CCC in the timing graph is converted into a list of two nodes in the move graph corresponding to the sizing move and the $V_t$ move. If the algorithm operates in the transistor mode, a CCC with m transistors is converted into a string of 2 m nodes, two for each transistor. In fact, the above conversion can be more flexible.

Any design change on a CCC can become a move node and can join, or be added to, the string, as long as that design change represents a discrete operation. For example, these discrete operation design changes include choices among multiple supply voltages and choices among multiple oxide thickness. To achieve a faster convergence, the string can also include nodes that represent combined moves. For example, one node can represent higher $V_t$ selection plus downsizing of PMOS transistors, and this node can be added to the string of nodes in the move graph. The size of the move graph increases linearly with the number of candidate design changes to be considered for a CCC, making methods in accordance with the present invention scalable.

If there exists a directed path between two CCCs in the timing graph, there also exists a directed path between any pair of their resulting nodes in the move graph. Maintenance of this property ensures the correctness of the heuristic of the present invention. The graph conversion only needs to be performed once during the initialization of the algorithm, and the move graph can be used repeatedly. However, the $\Delta P$ and $\Delta D$ values of a given move node are updated when the IC design is modified. If a move becomes infeasible, for example, a $V_t$ move becomes infeasible when a transistor is already using the highest threshold voltage, the $\Delta P$ and $\Delta D$ values of that node are simply set to zero so that the node will not be selected using the node weight procedure as described below.

According to graph theory, the maximum independent set (MIS) of a graph is defined as the largest set of nodes such that no two nodes in the set are adjacent. The weighted maximum independent set (WMIS) of a node-weighted graph is defined as the set of nodes with the maximum weight sum such that no two nodes in this set are adjacent. The transitive closure of a directed graph $G_1$ is another directed graph $G_2$ constructed by adding directed edges to $G_1$ such that there exists an edge from node a to node b in $G_2$ if and only if there exists a directed path from a to b in $G_1$. The transitive reduction of $G_1$ is defined as the smallest directed graph such that its transitive closure is also $G_2$.

Figure 3:
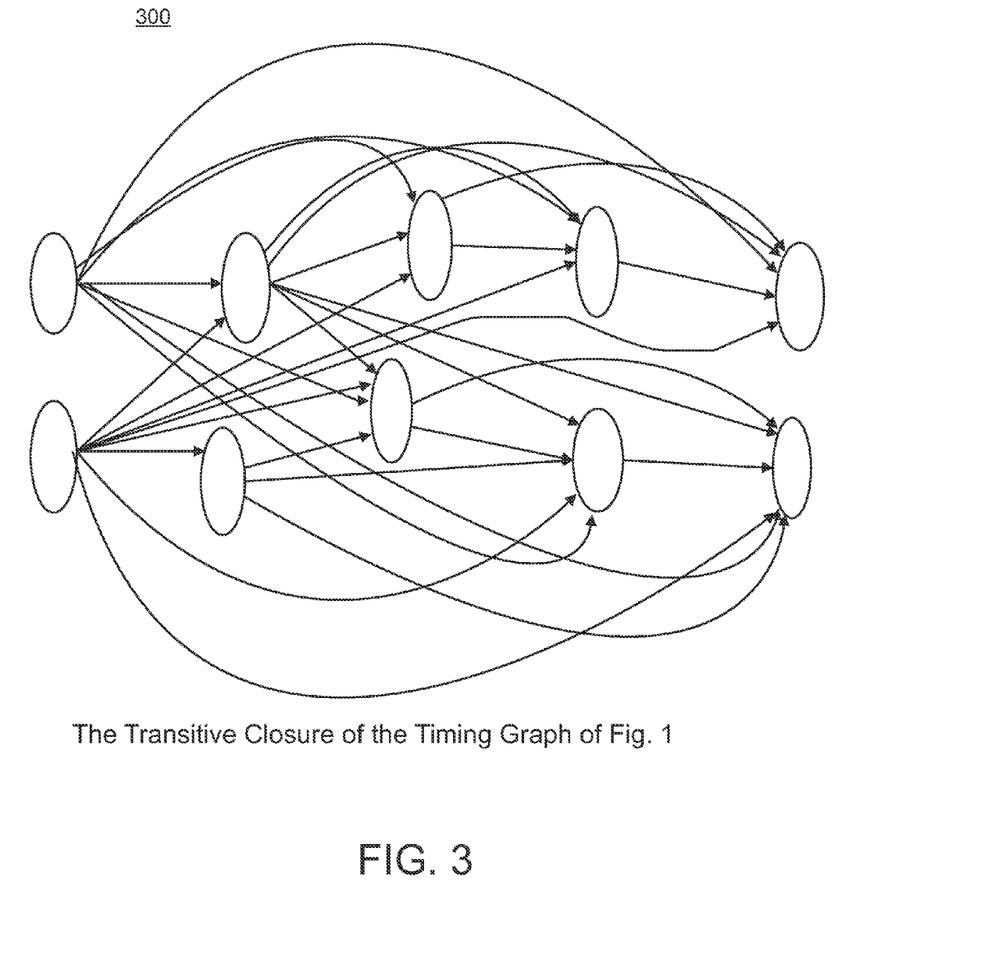
FIG. 3 is a schematic representation of the transitive closure of the timing graph of FIG. 1.

Referring to FIG. 3, the transitive closure 300 of the timing graph of FIG. 1 is illustrated, ignoring the edges inside CCCs. Conversely, FIG. 1 is the transitive reduction of FIG. 3. In general, however, if $G_2$ is the transitive closure of $G_1$, $G_1$ is not necessarily the transitive reduction of $G_2$. In that case, $G_1$ is referred to as a relaxed transitive reduction of $G_2$. If the move graph, for example as illustrated in FIG. 2, is graph $G_1$ and the transitive closure $G_2$ is constructed, the WMIS of $G_2$ is found based on the following node weight definition:

$$\text{node weight} = \begin{cases} \frac{\Delta P}{\Delta D} & \text{if } \Delta D < S_{CCC} - S_{target} \\ 0 & \text{if } \Delta D \geq S_{CCC} - S_{target} \end{cases}$$

where $\Delta D$, $\Delta P$ are as defined for this move node, $S_{target}$ is as defined in the problem statement, and $S_{CCC}$ is measured for the move node in the timing graph. This weight definition for a move node is a sensitivity function that is zero if the move is infeasible under the timing constraint. Intuitively, this serves as the merit function of a node, and methods in accordance with the present invention try to maximize the total value of the chosen moves.

The WMIS of the transitive closure graph $G_2$ corresponds to the node set with the maximum weight sum in the move graph $G_1$ such that there does not exist a directed path between any two nodes in this set. If there is no path between two move nodes, the two affected CCCs do not share a data path in the IC design. Therefore, if the design changes represented by the WMIS are applied on the IC design, each modified CCC is independent from the others in terms of timing and is only affected by its own $\Delta D$. According to the node weight definition, any move with a positive weight is feasible, and applying these changes will not cause a timing violation.

The power optimization problem is converted into an iterative process. Each iteration identifies the WMIS of the transitive closure of the move graph and applies the design changes specified by the WMIS. For a large timing graph, finding its transitive closure graph can be expensive in terms of both time and space complexity. Fortunately, for acyclic graphs, there exists a correspondence between the WMIS of the transitive closure and the minimum flow of the relaxed transitive reduction graphs. The minimum flow problem considers a directed graph with a set of source nodes and sink nodes. For a non-source non-sink node, the sum of the in-flows equals all out-flows. Each node has a non-negative minimum capacity, and the problem is to find the minimum flow that can be routed from source nodes to sink nodes such that the flow through each node is at least its assigned minimum capacity. The minimum flow problem can be mapped to the commonly known maximum flow problem and can be solved in polynomial time. If the minimum capacity of any node is assigned to be equal to the node weight, for an acyclic directed graph $G_1$ and its transitive closure $G_2$, the sum of node weights of the WMIS of $G_2$ is equal to the minimum flow of $G_2$. Because of the fact that the minimum flow of $G_2$ is equal to the minimum flow of any of its relaxed transitive reduction graphs, the minimum flow of $G_1$ is also equal to the sum of node weights of the WMIS of $G_2$. Therefore, the transitive closure $G_2$ is not built explicitly, and only the original relaxed transitive reduction $G_1$ is used. First, the minimum flow of $G_1$ is found, then techniques are used available to identify the WMIS of the transitive closure.

As described above, the move graph was assumed to be acyclic, which is true for the majority of designs where the CCC timing graph is acyclic. However the CCC timing graph of a design is not necessarily acyclic in general. For timing graphs that are not acyclic, certain timing propagation segments are ignored to make these graphs acyclic. Typically only a few edges need to be dropped from the timing graph. In one embodiment, to minimize the incurred accuracy impact, the max-slack edge of each cycle is selected to be dropped.

This iterative algorithm in accordance with the present invention that is based on finding WMIS in each iteration is a sequence of local optimizations that does not guarantee optimality of the overall solution to the optimization problem. However, the algorithm has the capability to handle multiple design options and various practical constraints.

No-touch constraints are handled by forcing zero sensitivity, i.e., zero weight, on the corresponding graph nodes. Slew constraints and the grouping constraints are handled differently. A grouping constraint dictates that the group members are identically modified. For example, in FIG. 2, if the PMOS transistors in CCC1 214 and the PMOS transistors in CCC2 216 are grouped, the CCC1 Ptree $V_t$ move 218 and the CCC2 Ptree $V_t$ move 220 happen together. In addition, the CCC1 Ptree Sizing move 222 and the CCC1 Ptree Sizing move 224 happen together. In one embodiment, a preprocessing step is added to merge the nodes in the move graph to honor these constraints. The two nodes are merged into a single node. The resulting single node represents a group of moves and is referred to as a group node. Merger operations in accordance with the present invention convert the original move graph containing only single move nodes to a new move graph containing the remaining independent single move nodes plus the newly created group nodes. This new mixed move graph is used in the iterative algorithm.

If a member in a group is designated as no-touch, all other members in the group are designated as no-touch. After the merger operations, the resulting new graph remains acyclic, and the correlation among the move nodes is maintained. In other words, if there exists a directed path from move node a to move node b in the original move graph before mergers, there must still exist a directed path from the representative of a, either a itself or a group node that contains a, to the representative of b.

Figure 4:
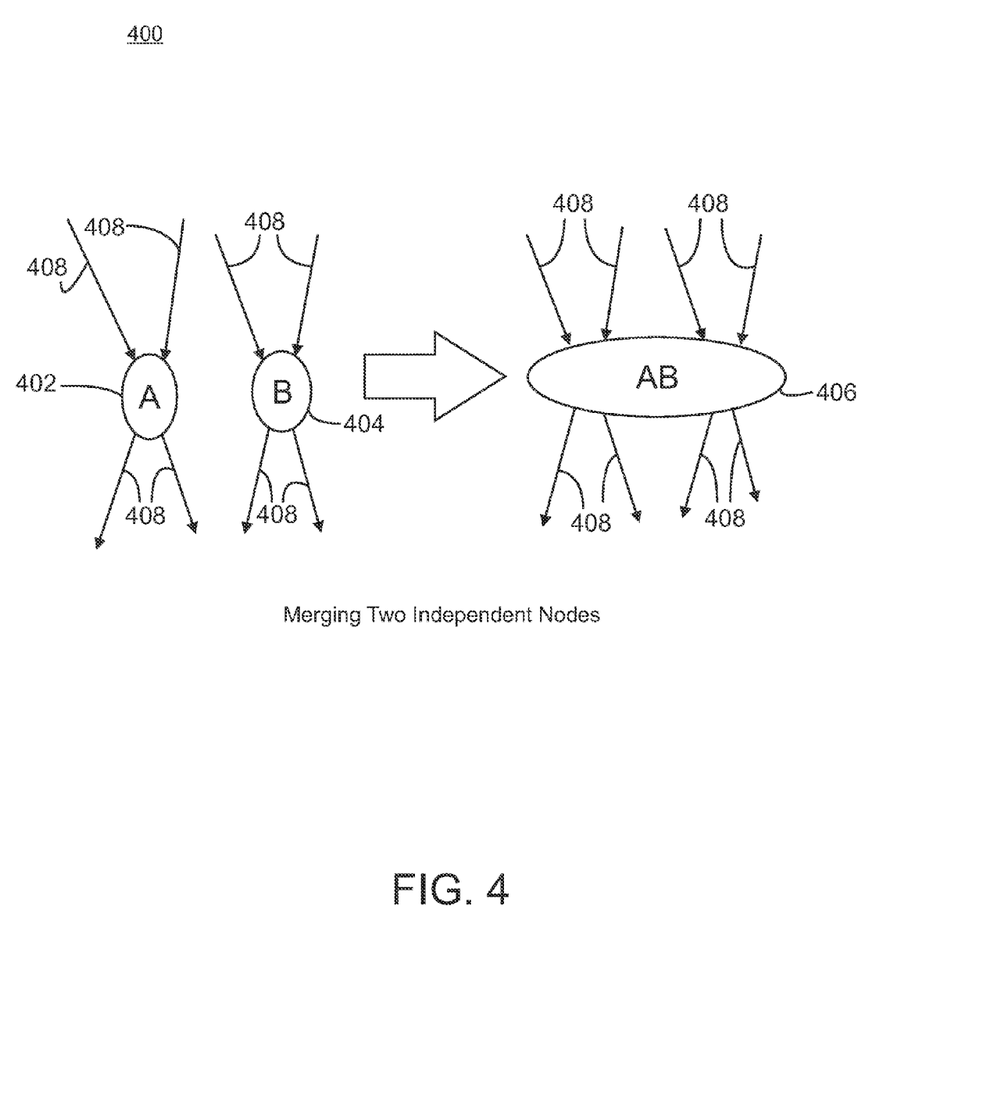
FIG. 4 is a schematic representation of an embodiment of merging two independent nodes in accordance with the present invention.
Figure 5:
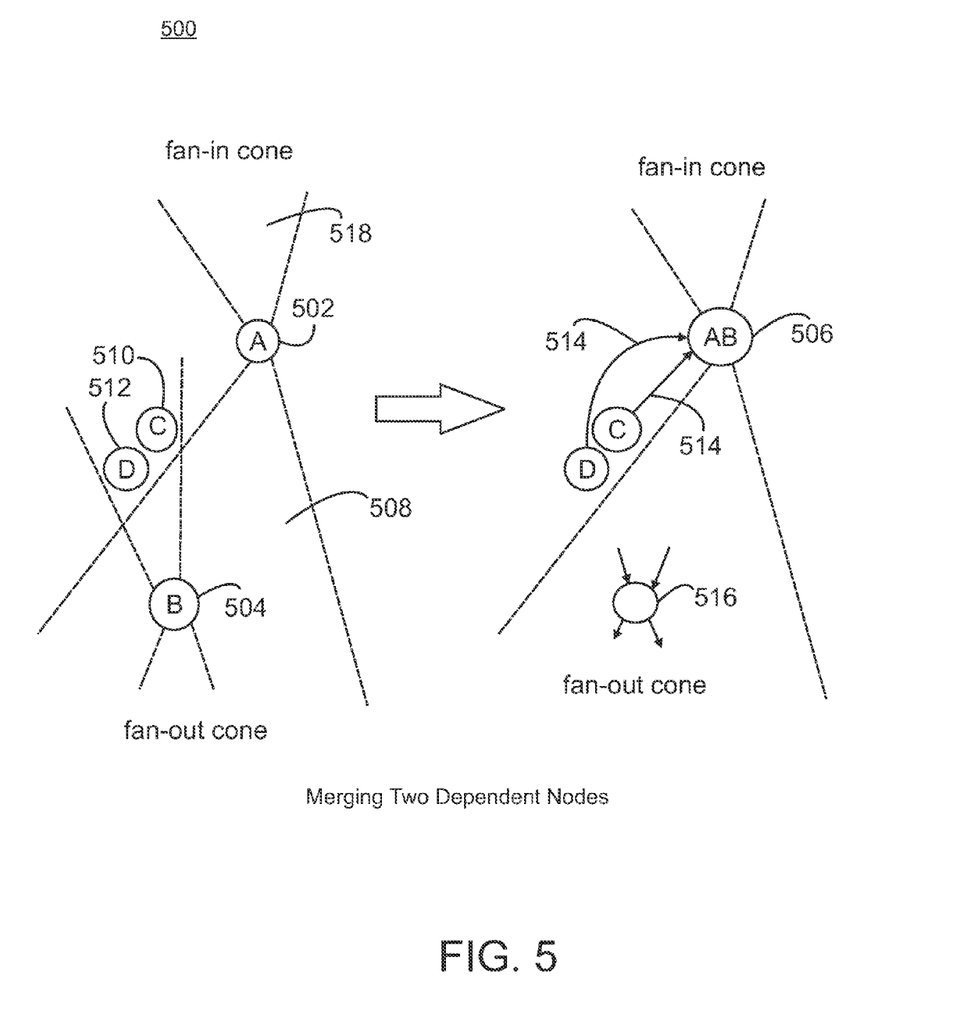
FIG. 5 is a schematic representation of an embodiment of merging two dependent nodes in accordance with the present invention.

Referring to FIG. 4, an exemplary embodiment of the merger of two independent nodes 400 is illustrated. The first node 402 and second node 404 do not share a path and are merged into a combined node 406. The paths 408 are preserved in the combined node as were found in the two independent nodes. Referring to FIG. 5, an exemplary embodiment of the merger of two dependent nodes 500 is illustrated. A first node 502 and a second node 504 are merged into a combined node 506; however, the second node 504 is inside the fan-out cone 508 of the first node 502. The original move graph also included a third node 510 and a fourth node 512 that are outside the fan out cone 508 of the first node 502 but that are encountered during an upstream traversal from the second node 504. In the modified move graph, new edges 514 are added from the third and fourth nodes to the merged node 506. In addition, a blank node 516 is added to the move graph to replace the second node to maintain connectivity among the neighboring nodes of the second node. The merging operation is similar for the case when the second node 504 is in the fan-in cone 518 of the first node 502. Groups containing more than two nodes are merged by repeating the above operations. The worst-case complexity of merging all groups is quadratic with respect to the number of nodes in the move graph, and this is a one-time overhead at the initialization stage of the algorithm.

In one embodiment, each group node in the move graph created from the merger of two or more nodes is assigned a weight, i.e., sensitivity. In one embodiment, the $\Delta P_{group}/\Delta D_{group}$ is used. The $\Delta P_{group}$ of a group node is defined as the sum of $\Delta P$ values of the original single move nodes. In order to evaluate $\Delta D_{group}$, for original move nodes $1, 2, \ldots, k$ a new directed graph G is constructed containing these nodes such that there exists a directed path from node i to node j in G if and only if there exists a directed path from i to j in the original move graph. G is not unique and is acyclic if the original move graph is acyclic. For a directed path Y in G, the length of this directed path is $L_Y = \Sigma_{i \in Y} \Delta D_i$. For node j, $\Delta D_j = \max_{Y passes j} L_Y$, and for the group node $\Delta D_{group} = \max_j \Delta D_j$. The group node is considered infeasible and has zero sensitivity if for any node j, $\Delta D_j$ is greater than $S_{CCC}$-$S_{target}$. Such sensitivity calculation and feasibility check can be done in linear runtime with respect to the group size.

Honoring the slew constraints are done both in the $\Delta D$ calculation and in the post-validation of the applied moves. During the calculation of $\Delta D$, output slews are monitored, and any slew violation due to a suggested move is penalized by increasing the $\Delta D$ by a large number. This forces the algorithm to skip such a move with a low weight. If the move is still picked by the procedure and applied to the design, the post-validation step of static timing analysis based on the modified circuit may indicate slew violations. When a slew violation is detected after one iteration, the move that causes this violation is identified based on timing path information and is revoked, i.e., is reverted back to its original status.

In one embodiment, the weighting scheme is generalized to include slack-criticality of the design. Based on the current timing slacks and the targets, a criticality metric is propagated within the circuit and incorporated in the weights for each move node. An embodiment of the method of the present invention is summarized in the following pseudo-code:

Build acyclic timing graph;
Convert timing graph to move graph;
Merge grouped move nodes into group nodes;
Propagate no-touch designations;
Loop until convergence:
    Update node weight=sensitivity;
    Find WMIS;
    Apply design changes;
    Revoke moves if timing violation;

Examples of methods in accordance with the present invention were conducted using a number of circuit macros from a high-performance microprocessor core implemented in a state-of-the-art technology (65 nm, SOI). These macros are implemented by mostly regular-$V_t$ devices, while some critical-path elements may have low-$V_t$ devices. The macro sizes range from hundreds of devices to tens of thousands of devices. The timing performance of the macros is satisfactory, but the power performance, especially leakage, needs to be greatly improved to meet the power specifications of the end product. A. Experimenting Different Modes Referring to Table I results of a first example are provided where three circuits were used to evaluate the performance of high-$V_t$ assignment in CCC, Ptree/Ntree and Transistor modes. The initial timing slack is preserved, i.e., the initial and final timing slacks are the same in each run. No grouping constraint is imposed. The transistor mode always gives the largest leakage savings, at the expense of more runtime, 3-4 times that of the CCC-level. Transistor mode also impacts the rest of the design tasks, e.g., layout generation, transistor back-annotation, library support. The Ptree/Ntree mode brings intermediate results and could be used whenever the cell libraries can support it. If used in a design flow, each cell need to be provided in not only all-$V_t$ modes but also in hybrid combinations (nfets and pfets may have different $V_t$'s). This typically results in a larger number of cells that need to be supported by the cell library. Looking at the CCC mode, the algorithm achieved reduction in bulk of the leakage and rather keep the following design automation tasks as is with very little post-optimization impact. The post-optimization tasks often remain the same since a particular CCC can be replaced with a different version of $V_t$. This is similar to gate-level optimization in many aspects. For all other experiments, the CCC mode was used as it is the most efficient and often preferred mode due to the simplicity and practicality of post-processing and back-annotation tasks following this optimization.

TABLE I

LEAKAGE REDUCTION BY HIGH-$V_t$ ASSIGNMENT ONLY

| Circuit | Initial Leakage | Mode | Final Leakage | Reduction |
|---|---|---|---|---|
| #1 | 1.49 mW | CCC | 0.787 mW | 47.22% |
| | | Ptree/Ntree | 0.484 mW | 67.54% |
| | | Transistor | 0.453 mW | 69.92% |
| #2 | 11.6 mW | CCC | 9.19 mW | 20.81% |
| | | Ptree/Ntree | 8.67 mW | 25.30% |
| | | Transistor | 8.58 mW | 26.05% |
| #3 | 6.02 mW | CCC | 5.48 mW | 8.92% |
| | | Ptree/Ntree | 5.46 mW | 9.25% |
| | | Transistor | 5.25 mW | 12.74% |

Referring to Table II, the results of the second example are illustrated that used tight power performance specifications. High-$V_t$ assignment only is compared to simultaneous high-$V_t$ assignment and transistor downsizing, both in CCC mode. Each downsizing move used a scaling factor of 0.8. No grouping constraint was imposed, except for the results in the last column. By high-$V_t$ assignment only, the dynamic power is also reduced by a few percent, since the capacitance of the higher $V_t$ devices are less than the regular ones. The overall runtime of high-$V_t$ assignment including the initial timing is only 2-4 times that of a complete static timing analysis. Such efficiency is achieved by using an incremental timing analysis engine and semi-analytical hardware-based power models that don't require excessive simulation.

The runtime of simultaneous high-$V_t$ assignment and transistor downsizing, however, is 50-200 times that of a complete static timing analysis. On the other hand, more power reduction is achieved with such extra effort. The only exception is benchmark 7, where the total power reduction by high-$V_t$ plus downsizing is slightly less than that by high-$V_t$ assignment alone. In this case, the local optimization of an early iteration leads to a less satisfactory final solution. The last column of Table II shows the impact of grouping constraints. The designs typically contain several levels of hierarchy, and grouping constraints are added to guarantee the structural connectivity of the post-optimization circuit. Clearly the additional constraints resulted in an unfavorable power reduction, but these are the results of necessities and requirements of a real-life design flow.

TABLE II

POWER REDUCTIONS BY HIGH-VV, BY SIMULTANEOUS HIGH-$V_t$ AND WIDTH DOWNSIZING AND HIGH-$V_t$ UNDER GROUPING CONSTRAINTS

| | | | After High-$V_t$ | | After High-$V_t$ and width downsizing | | After High-$V_t$ with grouping Leakage reduction |
|---|---|---|---|---|---|---|---|
| Circuit | Initial Leakage Power | Initial Dynamic Power | Leakage reduction | Total Power Reduction | Leakage reduction | Total Power Reduction | |
| #4 | 1.06 mW | 1.24 mW | 69% | 33.9% | 69% | 60.7% | 62.6% |
| #5 | 0.20 mW | 0.25 mW | 33.8% | 16% | 42.1% | 33.64% | 12.3% |
| #6 | 0.99 mW | 1.23 mW | 40.93% | 19.38% | 45.6% | 37.9% | 9.1% |
| #7 | 1.84 mW | 2.23 mW | 28.35% | 13.66% | 14.6% | 11.1% | 10.4% |
| #8 | 5.01 mW | 5.93 mW | 22.29% | 10.81% | 31.8% | 27.0% | 8.2% |
| #9 | 4.67 mW | 5.67 mW | 15.59% | 7.46% | 20.9% | 16.47% | 7.3% |
| #10 | 4.93 mW | 5.96 mW | 25.74% | 12.37% | 32.16% | 26.37% | 9.1% |
| #11 | 8.66 mW | 10.6 mW | 40.71% | 19.46% | 25.75% | 29.44% | 11.5% |
| #12 | 3.69 mW | 4.51 mW | 22.20% | 10.59% | 36.47% | 29.12% | 6.2% |
| #13 | 5.17 mW | 6.30 mW | 36.77% | 17.59% | 36.42% | 30.06% | 20.1% |

TABLE III

POWER REDUCTION BY NEAR-OPTIMAL MIN-AREA TRANSISTOR SIZING, HIGH $V_t$ ASSIGNMENT, AND BY THE SEQUENTIAL RUN OF THE TWO

| | Width downsizing | | High-$V_t$ | | Both high-$V_t$ and width downsizing | |
|---|---|---|---|---|---|---|
| Circuit | Leakage power reduction | Total power reduction | Leakage power reduction | Total power reduction | Leakage power reduction | Total power reduction |
| #14 | 26.87% | 25.98% | 26.82% | 16.05% | 41.09% | 34.38% |
| #15 | 19.57% | 20.06% | 35.95% | 20.24% | 45.65% | 34.78% |
| #16 | 8.88% | 8.91% | 19.22% | 11.64% | 25.58% | 19.01% |
| #17 | 11.05% | 10.98% | 11.82% | 6.64% | 22.44% | 17.4% |
| #18 | 7.84% | 6.69% | 10.21% | 4.96% | 14.78% | 10.09% |

Referring to Table III, the method of the present invention was used in conjunction with a formal circuit optimization tool that yields almost optimal transistor sizes for area minimization under timing and other constraints. The optimizer works on the objective of reducing area based on timing constraints and results in smaller widths for transistors located in non-critical paths. Hence, the leakage and dynamic power could be reduced without affecting the critical paths and timing requirements. The optimizer operates on delay sensitivities of each CCC with respect to device widths. For each circuit, three different runs were performed. The first run utilized the formal optimization tool that only carried out transistor sizing. The second run only utilized the method of the present invention in high-$V_t$ assignment only. The third run was a cascade run that utilized the method of the present invention in high-$V_t$ assignment after the formal optimization tool. In these three runs, the minimum slack of the circuit was preserved, all the constraints required from hierarchy and layout were honored. The results suggest that transistor-width optimization alone to minimize area is inferior in terms of leakage power to our approach where leakage is targeted for the optimization, and that both methods complement each other and produce the best results when used together.

In another example, the performance of the method of the present invention was evaluated with multiple types of moves. High-$V_t$ assignment and longer device length may be used to mitigate leakage of devices located in non-critical paths. To compare the benefits of these techniques when applied individually and jointly, the method was performed with three different schemes with identical timing and other constraints: CCC-level high-$V_t$ assignment only, simultaneous CCC-level high-$V_t$ assignment and CCC-level channel length biasing, and CCC-level high-$V_t$ assignment followed by transistor-level channel length biasing. For these experiments, the device length was allowed to increase by 2 nm or 4 nm from the nominal value.

The second scheme modeled the effect of design-time channel-length optimization, since the changes are performed on each CCC and can be followed by post-optimization tasks. The third scheme models the effect of post-layout channel-length optimization, since transistor-level optimization results can be applied directly to the final layout at the very end of the design flow.

The results in Table IV suggest that the additional flexibility of channel length biasing results in a 5-8% further leakage reduction compared to only using high-$V_t$ by varying doping concentration. For these test cases, which are based on 65 nm technology, the primary reason for these extra power savings is that channel length biasing is a more fine-grain operation than a $V_t$ change, and therefore help to reach better a power-delay trade-off point in the solution space.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing

TABLE IV

POWER REDUCTION BY CHANNEL LENGTH BIASING

| Circuit | CCC-High-$V_t$ | | Joint CCC-level High-$V_t$ and Channel-length | | CCC-High-$V_t$ followed by transistor-level Channel-length | |
|---|---|---|---|---|---|---|
| | Leakage power reduction | Total power reduction | Leakage power reduction | Total power reduction | Leakage power reduction | Total power reduction |
| #19 | 57.87% | 50.28% | 64.05% | 54.91% | 63.46% | 54.74% |
| #20 | 20.9% | 18.24% | 25.56% | 21.96% | 24.74% | 21.32% |
| #21 | 44.78% | 38.94% | 52.79% | 45.29% | 52.82% | 45.32% |
| #22 | 40.67% | 35.06% | 46.65% | 39.7% | 45.03% | 39.1% | a machine-executable or computer-executable code that when read by a machine or computer causes the machine or computer to perform a method for optimizing an integrated circuit design in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for optimizing an integrated circuit design, the method comprising:
   establishing an acyclic timing graph comprising a plurality of nodes and a plurality of directed edges, each node corresponding to a set of channel-connected components in an integrated circuit design and each directed edge corresponding to a path between a given pair of nodes;
   converting the timing graph to a move graph comprising a plurality of move nodes and the plurality of directed edges by converting each timing graph node to a corresponding move node and maintaining the directed edges between given pairs of timing graph nodes between the corresponding move nodes, each move node corresponding to a single design change in at least a portion of one of the channel-connected components in the corresponding timing graph node, the single design change affecting power consumption of the integrated circuit design;
   using the move graph to identify modifications to components in the integrated circuit design that reduce power consumption in the integrated circuit design without creating a timing violation; and
   modifying the integrated circuit design in accordance with the identified modifications.

2. The method of claim 1, wherein each timing graph node is converted into two or more move nodes.

3. The method of claim 1, further comprising:
   identifying a timing impact and a power impact for each move node resulting from the change in the channel-connected components associated with each move node; and
   using the timing impact and power impact to assign a node weight to each move node.

4. The method of claim 1, further comprising merging move nodes into group nodes, each group node resulting from the merger of at least two move nodes.

5. The method of claim 4, further comprising adding edges between pairs of nodes and blank nodes to the move graph as needed to maintain connectivity among the move nodes and the group nodes.

6. The method of claim 4, further comprising merging group nodes.

7. The method of claim 4, further comprising
   identifying a timing impact and a power impact for each group node resulting from all changes in the channel-connected components associated with each move node in each group node; and
   using the timing impact and power impact to assign a node weight to each group node.

8. The method of claim 1, further comprising:
   identifying components within the integrated circuit design that are not to be modified; and
   propagating the identification of these components through the timing graph and the move graph.

9. The method of claim 1, wherein the method further comprises assigning a weight to each move node based on a timing impact and a power impact resulting from the change in the channel-connected components associated with each move node; and
   the step of using the move graph to identify modifications further comprises selecting a set of move nodes from the move graph such that the cumulative weight associated with the move nodes in the set of move nodes is a maximum and a directed path does not exist between any two move nodes in the set of move nodes.

10. The method of claim 9, wherein the step of selecting a set of move nodes further comprises identifying a transitive closure graph for the move graph and identifying the weighted maximum independent set for the transitive closure graph.

11. The method of claim 9, further comprising applying changes in the channel-connected components corresponding to move nodes in the selected set of move nodes.

12. The method of claim 11, further comprising updating node weights in accordance with the applied changes in the channel-connected components.

13. The method of claim 11, further comprising:
   checking the integrated circuit design for timing violations caused by the applied changes; and
   reversing applied changes associated with timing violations.

14. A computer-readable medium containing a computer-readable code that when read by a computer causes the computer to perform a method for optimizing an integrated circuit design, the method comprising:
   establishing an acyclic timing graph comprising a plurality of nodes and a plurality of directed edges, each node corresponding to a set of channel-connected components in an integrated circuit design and each directed edge corresponding to a path between a given pair of nodes;
   converting the timing graph to a move graph comprising a plurality of move nodes and the plurality of directed edges by converting each timing graph node to a corresponding move node and maintaining the directed edges between given pairs of timing graph nodes between the corresponding move nodes, each move node corresponding to a single design change in at least a portion of one of the channel-connected components in the corresponding timing graph node, the single design change affecting power consumption of the integrated circuit design;

using the move graph to identify modifications to components in the integrated circuit design that reduce power consumption in the integrated circuit design without creating a timing violation; and modifying the integrated circuit design in accordance with the identified modifications.

15. The computer-readable medium of claim 14, wherein the method further comprises identifying a timing impact and a power impact for each move node resulting from the change in the channel-connected components associated with each move node; and using the timing impact and power impact to assign a node weight to each move node.

16. The computer-readable medium of claim 14, wherein the method further comprises identifying components within the integrated circuit design that are not to be modified; and propagating the identification of these components through the timing graph and the move graph.

17. The computer-readable medium of claim 14, wherein the method further comprises assigning a weight to each move node based on a timing impact and a power impact resulting from the change in the channel-connected components associated with each move node; and the step of using the move graph to identify modifications further comprises selecting a set of move nodes from the move graph such that the cumulative weight associated with the move nodes in the set of move nodes is a maximum and a directed path does not exist between any two move nodes in the set of move nodes.

18. The computer-readable medium of claim 17, wherein the step of selecting a set of move nodes further comprises identifying a transitive closure graph for the move graph and identifying the weighted maximum independent set for the transitive closure graph.

19. The computer-readable medium of claim 17, wherein the method further comprises applying changes in the channel-connected components corresponding to move nodes in the selected set of move nodes.

* * * * *